Aug. 5, 1947.  A. T. BREMSER  2,425,229
FUEL INJECTION APPARATUS
Filed Oct. 11, 1940
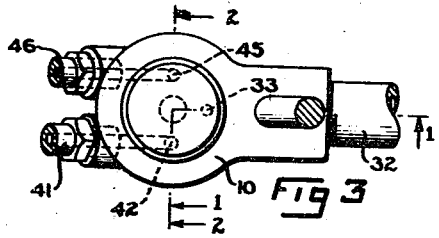
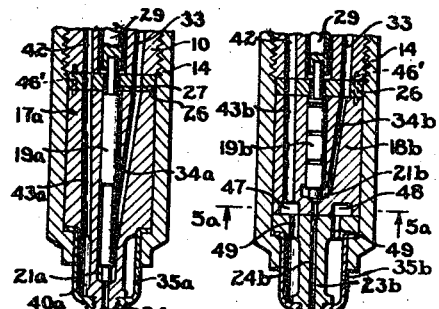
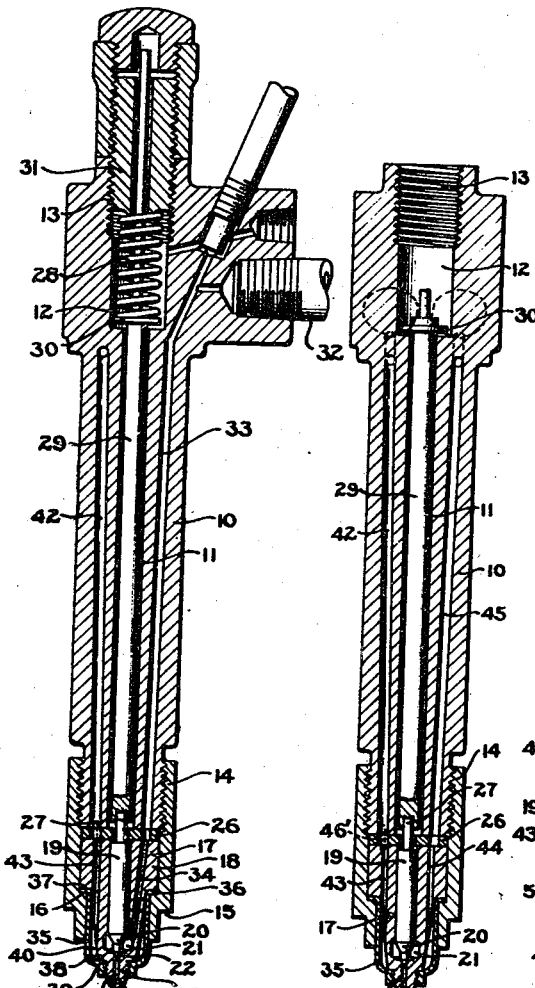
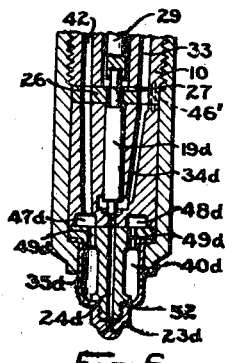
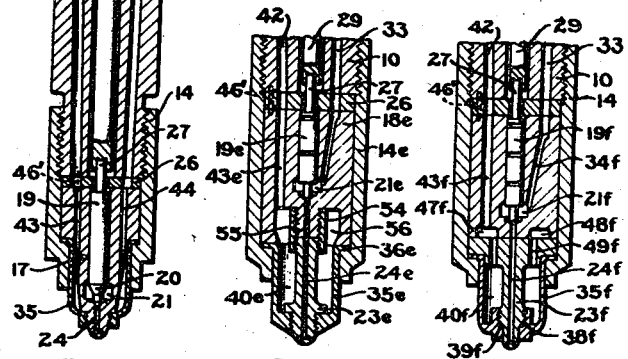
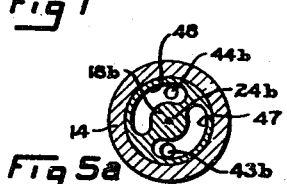
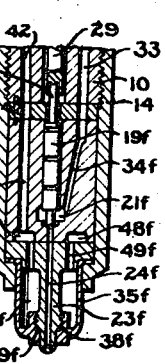
INVENTOR
Albert T. Bremser
BY
F. Bascom Smith
ATTORNEY.

Patented Aug. 5, 1947

2,425,229

UNITED STATES PATENT OFFICE 2,425,229

FUEL INJECTION APPARATUS

Albert T. Bremser, Sidney, N. Y., assignor to Bendix Aviation Corporation, South Bend, Ind., a corporation of Delaware Application October 11, 1940, Serial No. 360,729

6 Claims. (Cl. 299—107.6)

This invention relates to fuel injection apparatus for internal combustion engines, and more particularly to nozzles for injecting liquid fuel into the engine cylinders.

One of the objects of the present invention is to provide a novel fluid cooled fuel injection nozzle wherein the fuel supply and cooling passages are embodied in a unitary structure.

Another object of the invention is to provide a fuel injection nozzle of the above character wherein the parts are so constructed and assembled as to insure against any leakage of the cooling medium or fuel.

Still another object is to provide a novelly constructed fuel injection nozzle which may be readily and inexpensively manufactured and assembled and which occupies a minimum amount of space in the cylinder head of an engine.

A further object is to provide a novel fluid cooled injection nozzle which may be readily disassembled for cleaning of the cooling fluid and fuel passages and which is so constructed that said passages may be readily and thoroughly cleaned.

A still further object is to provide a novel device of the above character wherein efficient and effective cooling of the valve means thereof is accomplished.

The above and further objects and novel features of the invention will more fully appear from the following detailed description when the same is read in connection with the accompanying drawings. It is to be expressly understood, however, that the drawings are for the purpose of illustration only and are not intended to define the limits of the invention, reference for this latter purpose being had primarily to the appended claims.

In the drawings, wherein like reference characters refer to like parts throughout the several views, Fig. 1 is a longitudinal elevation, mostly in section and with parts broken away, of one form of injection nozzle embodying features of the present invention, the section being taken substantially on line 1—1 of Fig. 3;

Fig. 2 is a longitudinal sectional view, showing a portion only of the device of Fig. 1, the section being taken substantially on line 2—2 of Fig. 3;

Fig. 3 is a top plan view, with parts broken away, of the apparatus shown in Fig. 1;

Figs. 4 to 8, inclusive, are detail sectional views, each showing the lower portion of a different form of injection nozzle embodying the invention, the section in each of said figures being taken along the same planes as the section of Fig. 1; and Fig. 5a is a cross-sectional view taken along line 5a—5a of Fig. 5.

The embodiment of the invention illustrated, by way of example, in Figs. 1 to 3, inclusive, of the drawings comprises a nozzle holder body 10 having a relatively small external diameter and a central bore 11 which is enlarged at 12 and threaded at 13 for a purpose to hereinafter appear. Threadedly secured to the reduced lower end of body 10 is a tubular tip holder or sleeve nut 14, which is provided with an external peripheral shoulder 15 that is adapted to engage a shoulder in a suitable opening in an engine cylinder head (not shown) whereby the nozzle may be supported and a gas-tight seal formed when the nozzle is clamped tightly in position on the cylinder head. The nozzle may be secured in the cylinder head by any suitable clamping means well-known in the art.

Interposed between the lower end of body 10 and an internal shoulder 16 in tip holder 14 and extending downwardly through a reduced portion of said holder is a member 17 which constitutes a spray tip or nozzle and valve guide. The upper or valve guide portion 18 of said member has a sliding fit in the larger part of nut 14 and is provided with a central bore in which a valve 19 is slidably received. A reduced portion 20 of the valve is surrounded by an enlarged bore in member 18, thereby forming a fuel pressure chamber 21 and the cone-shaped lower end 22 of the valve is adapted to engage a valve seat in the tip portion 23 of member 17 to thereby control the flow of fuel through the central spray tip passage 24 and diverging orifices 25 into the combustion space of an engine cylinder (not shown) as will hereinafter appear. It may be desirable in some instances to construct spray tip 23 and valve guide 18 as two separate elements, as in Figs. 5 to 8.

For the purpose of limiting the opening movement of valve 19 to thereby prevent the injection of excessive charges of fuel and enhance the efficiency and operating characteristics of the engine in which the nozzle is employed, particularly over long periods of use, a relatively thin metallic plate 26 is interposed between member 17 and body 10. Said plate has a central opening through which a reduced portion 27 of valve 19 freely extends but which has a diameter somewhat less than the main body portion of said valve. Plate 26 is preferably made of hard close-grained steel or of suitable hardened metal which will resist wear or internal structural collapse during the continuous hammering of valve 19 against the same. This feature of the present nozzle is shown and claimed in my copending application, Serial No. 253,737, filed January 31, 1939.

Valve 19 is normally yieldably held in seated or closed position by suitable resilient means, such as a coil spring 28, which applies yielding pressure to the valve through the medium of a pressure pin or spindle 29 that freely extends through the central bore 11 in body 10. The lower end of spindle or rod 29 is preferably recessed for freely receiving the reduced upper end 27 of valve 19 so that there will be little or no tendency toward biasing the valve in its guide. Said spindle is provided adjacent its upper end with a collar 30 on which one end of spring 28 is seated. The other end of the spring engages the inner end of a plug nut or adjusting screw 31 which is externally threaded to engage screw threads 13.

Liquid fuel may be supplied to the engine cylinder through the above-described nozzle from a supply conduit 32 which communicates with a fuel passage 33 provided in body 10. Said passage communicates with pressure chamber 21 through an opening in plate 26 and a passage 34 in member 17. Thus, when pressure is applied to the fuel in the supply line and hence in chamber 21, valve 19 will be lifted from its seat against the yielding pressure of spring 28 and a charge of fuel will be injected into the engine cylinder through passages 24 and 25. The opening movement of valve 19 is limited, as pointed out above, by plate 26 so that the valve will be quickly seated again by spring 28 as soon as the fluid pressure in chamber 21 is reduced.

Novel means are provided whereby a circulatory system for a cooling medium, such as water, is formed so that said medium may be circulated immediately around the valve seat and valve guide to thereby materially increase the life of the injection nozzle and make it possible to use the same satisfactorily in engines which develop greater power, operate at higher speeds and, hence, normally cause greater heating of the nozzle. As shown in Fig. 1, said means comprises a cup-like shell or casing member 35 which slidably extends through the reduced portion of sleeve nut 14 and has an external flange 36 that extends between shoulder 16 of said nut and an external shoulder 37 on guide member 17. The lower reduced end of member 35 is internally threaded for cooperation with the externally threaded tip portion 23 of member 17, and the internal shoulders 38 and 39 of said members engage one another to form a fluid and gas-tight seal. Within casing member 35, an intermediate portion of nozzle member 17 is tapered inwardly between shoulders 37 and 38, thereby forming the inner wall of an annular cooling chamber 40.

Shell or casing 35 is preferably constructed of stainless steel or other suitable metal so that the wall thereof may be relatively thin and flexible, and yet withstand the heat and pressures to which it must be subjected. If the shell were not so constructed, it would be virtually impossible to continuously manufacture the various parts adjacent the nozzle tip so that fluid and gas-tight, disconnectable joints would be provided at both the upper and lower ends of chamber 40, i. e., without welding members 17 and 35 together. With the present novel construction, a tight joint is first effected at shoulders 38 and 39 by threading shell 35 onto tip portion 23. The shell is so constructed that when it is thus applied to member 17 there is a very slight clearance between flange 36 and shoulder 37, thereby insuring a tight seal at shoulders 38, 39. Because of the flexibility of the material from which shell 35 is constructed, this slight clearance is taken up and a tight joint or seal is insured at shoulders 16 and 37 when nut 14 is screwed tightly into place.

Any suitable fluid cooling medium may be introduced into chamber 40 through a supply line 41, a passage 42 in holder body 10, an aligned opening in plate 26, and a passage 43 in member 17. The flow of the cooling fluid out of chamber 40 is through a passage 44 (Fig. 2) in member 17, an aligned opening through plate 26, and a passage 45 in body 10 to a return conduit 46. If desired, suitable fins may be provided in shell 35 or on the tapered portion of member 17 within chamber 40 to direct the flow from passage 43 to passage 44. In most installations the circulation in chamber 40 is adequate without the provision of fins because the force of the coolant entering the chamber from passage 42 is sufficient to carry it to the bottom of the chamber. In order to insure proper alignment of the fuel and coolant passages a dowel 46' may be provided.

It will be seen that the cooling system thus formed as an integral part of the injection nozzle structure does not appreciably increase the size thereof or the space required therefor in the engine cylinder head and is effective to cool the needle valve and its seat, as well as the fuel in the vicinity thereof. The spraying characteristics and life of the valve are thereby materially increased and any pitting or corroding action of the hot fuel on the valve and valve seat is substantially eliminated. The major portion of the heat which would normally be absorbed by the injection nozzle passes through the wall of shell 35 directly into the cooling medium within chamber 40 and is carried away through the circulatory cooling system. The interior of shell 35 may be readily cleaned upon removal of the shell and if the latter should become deteriorated by the high heat within the engine cylinder, the same may be readily and inexpensively replaced.

One of the primary advantages of the novel structure thus provided resides in the fact that the cooling fluid passages are so arranged and the parts are so assembled that the nozzle may be readily disassembled and all of the fluid passages thoroughly cleaned without difficulty. It is virtually impossible under the usual operating conditions to prevent the accumulation of scale and other foreign matter in the relatively small cooling fluid passages of a nozzle of the type shown. These passages must be periodically cleaned if efficient operation is to be expected.

In the embodiments or modifications of the engines illustrated in Figs. 4 to 8, inclusive, the parts which are substantially identical with parts described above are indicated by the same reference numerals, whereas parts which are different in detail but correspond in function to parts already described are indicated by the same numeral supplemented by one of the small letters $a$, $b$, $d$, $e$, and $f$. Each of these embodiments will accordingly not be described in detail, it being understood that the portions broken away are the same as the corresponding portions shown in Figs. 1 to 3. It will also be understood that since the sections shown in Figs. 4 to 8 are the same as the section of Fig. 1, the return conduits for the cooling fluid corresponding to passages 44 and 45 of Fig. 2 are not seen.

In Fig. 4, member 17a is increased somewhat in length and the shape of needle valve 19a is altered so that the fuel may be introduced into chamber 21a at a point further removed from the valve seat, thereby making it possible to enlarge the capacity of cooling chamber 40a.

In the structure illustrated in Fig. 5, the valve guide member 18b and spray tip 23b are separate elements. The lower ends of passage 43b and the corresponding return flow passage (not shown) terminate in arcuate grooves 47 and 48, respectively, in the lower face of guide member 18b, and said grooves communicate with cooling chamber 40b through a plurality of circularly arranged openings 49 in the upper flanged portion of tip member 23b. Arcuate grooves 47 and 48 may be made to substantially surround the seat for needle valve 19b.

The construction shown in Fig. 6 is similar to that illustrated in Fig. 5, except that casing 35d is merely provided at the lower end thereof with an internal flexible flange 52 which is adapted to be clamped between a spray tip 23d and a shoulder on a fuel directing member 53 which forms the core or inner wall of cooling chamber 40d, said spray tip having threaded engagement with the lower end of said member. In this construction, the machining tolerances need be even less precise, insofar as shell 35d is concerned, than in the other embodiments, and the spray tip, as well as the shell, may be readily and inexpensively replaced when and if they become adversely affected by the high temperatures in the engine cylinder.

In Fig. 7, a nozzle is shown wherein the flange 36e of casing member 35e is clamped directly between nut 14e and valve guide member 18e, the spray tip 23e being connected to said guide member by means of an internally threaded sleeve 54 which is threaded onto a downwardly extending portion 55 of said guide member and into which the upper end of said spray tip is threaded. Sleeve 54 may, of course, be an integral part of either portion 55 or tip 23e. The cooling chamber 40e is thus in full and direct communication with an annular groove 56 in the lower face of member 18e.

The embodiment of Fig. 8 is substantially identical with the structure shown in Fig. 5, except that the cooperating threads on casing 35f and spray tip member 23f are on the opposite side of the engaging shoulders 38f and 39f. These threads will not then be affected by the hot gases in the engine cylinder or by the deposition of carbon therein from the burned gases. The choice between the two locations for the threads adjacent the lower end of the nozzle will depend on whether or not it is more desirable to protect the same from the effects of the hot gases of combustion or from the cooling fluid. The corresponding threads in the embodiment of Fig. 6 are protected in a large degree from both the hot gases and the cooling fluid.

There is thus provided a fuel injection nozzle having a liquid cooling system incorporated therein in a novel manner whereby the cooling fluid may be circulated in substantial quantities around the most vital parts of the nozzle and whereby the flow passages for the cooling fluid may be readily and thoroughly cleaned at desired intervals. The nozzle is also novelly constructed so that the parts thereof which are subjected to greatest deterioration during use may be readily replaced at low cost, thereby materially increasing the useful life of the more expensive parts of the structure and reducing the ultimate cost thereof. Additionally, the cooling system and fuel supply means are incorporated in what is virtually a unitary structure, that is, said system and means are incorporated in the same elements whereby the over-all size of the nozzle is comparatively small and requires only a relatively small opening in the cylinder head. The parts of the nozzle or injector are also fabricated and assembled in such a manner that there is little or no danger of any leakage of fuel or the cooling medium.

Although only a limited number of embodiments or modifications of the invention have been illustrated and described in detail, it is to be expressly understood that the same is not limited thereto. For example, various features of the different embodiments shown may be interchanged, that is, the manner of securing the cooling housing in place in the structures illustrated in Figs. 6 and 8 may be readily incorporated with the structures of Figs. 1 and 4. If desired, plate 26 may be eliminated from any of the illustrated embodiments and the needle valve caused to engage body holder 10 for limiting the opening movement thereof in a manner well understood in the art. Various changes may also be made in the design and arrangement of parts illustrated without departing from the spirit and scope of the invention as the same will now be understood by those skilled in the art. For a definition of the limits of the invention, reference is had primarily to the appended claims.

What is claimed is:

1. A fuel injection nozzle comprising a holder body, an element comprising a valve guide and spray nozzle, a valve in said element for controlling the flow of fuel therethrough, a casing member having threaded engagement with said element adjacent the lower end of the latter and forming a cooling fluid chamber with said element, and a tubular nut engaging an external flange on said member and threadedly engaging said holder body for holding said body, element and casing member in assembled relation, said casing member and element having one set of annular surfaces thereon pressed into fluid-tight engagement by the cooperating threads thereon and a second set of such surfaces brought into liquid-tight engagement by flexing said casing member during the installation of said nut.

2. A fuel injection nozzle comprising a holder body, a valve guide, a tubular nut threadedly engaging said body for holding said guide and body in assembled relation, and a tubular casing member surrounding a portion of said guide to form a cooling fluid chamber therewith, said casing member having threaded engagement with said guide adjacent one end thereof and a flange at the other end thereof between said nut and said guide, said flange being pressed into liquid-tight engagement with said guide by flexing said casing member during the installation of said nut.

3. A fuel injection nozzle comprising a holder body, fuel directing means including a fuel directing member, a tubular nut threadedly engaging said body for holding said body and member in assembled relation, a thin-walled casing surrounding a portion of said member and forming a chamber therewith, said casing having a flexible annular external flange at one end flexed by said nut into liquid-tight engagement with said member, and means for detachably securing the other end of said casing to said member and forming a liquid-tight seal between mating annular surfaces thereof, said body and member having communicating passages therein for directing a cooling medium to and from said annular chamber.

4. Apparatus of the class described comprising a plurality of assembled members constituting a fuel injection nozzle, a thin-walled casing member surrounding a portion of said nozzle and cooperating therewith to form a chamber, cooperating screw threads on said nozzle and casing member for holding flat annular surfaces of said nozzle and casing member in firm engagement to provide a fluid-tight seal, and means flexing an external annular flange on said casing into sealing engagement with an annular surface on a member of said nozzle.

5. Apparatus of the class described comprising a holder body, a nozzle member, a valve guide having a valve seat therein and interposed between said body and member, said guide having arcuate grooves in the face thereof adjacent said member, means for holding said body, guide and member in assembled relation, and a casing surrounding at least a portion of said member and cooperating therewith to form a chamber, said casing having screw threaded engagement with said member adjacent the outer end of the latter and an external flange interposed between said member and said holding means, said member having passages therein connecting said grooves and said chamber, and said body and guide having connecting passages therein for conducting a cooling medium to and from said grooves.

6. Apparatus of the class described comprising a plurality of assembled members constituting a fuel injection nozzle, a casing member surrounding a portion of said nozzle and cooperating therewith to form a chamber, cooperating screw threads on said nozzle and casing for holding mating annular surfaces thereof in firm engagement to provide a fluid-tight seal, said engaging surfaces being positioned externally of said screw threads with respect to said chamber, and means clamping an external flange of said casing into sealing engagement with a member of said nozzle.

ALBERT T. BREMSER.

REFERENCES CITED

The following references are of record in the file of this patent:

UNITED STATES PATENTS

| Number | Name | Date |
|---|---|---|
| 2,231,937 | Meyer et al. | Feb. 18, 1941 |
| 1,327,744 | Tartrais | Jan. 13, 1920 |
| 1,401,911 | Keller | Dec. 27, 1921 |

FOREIGN PATENTS

| Number | Country | Date |
|---|---|---|
| 36,683 | Netherlands | Oct. 15, 1935 |